Figure 1:
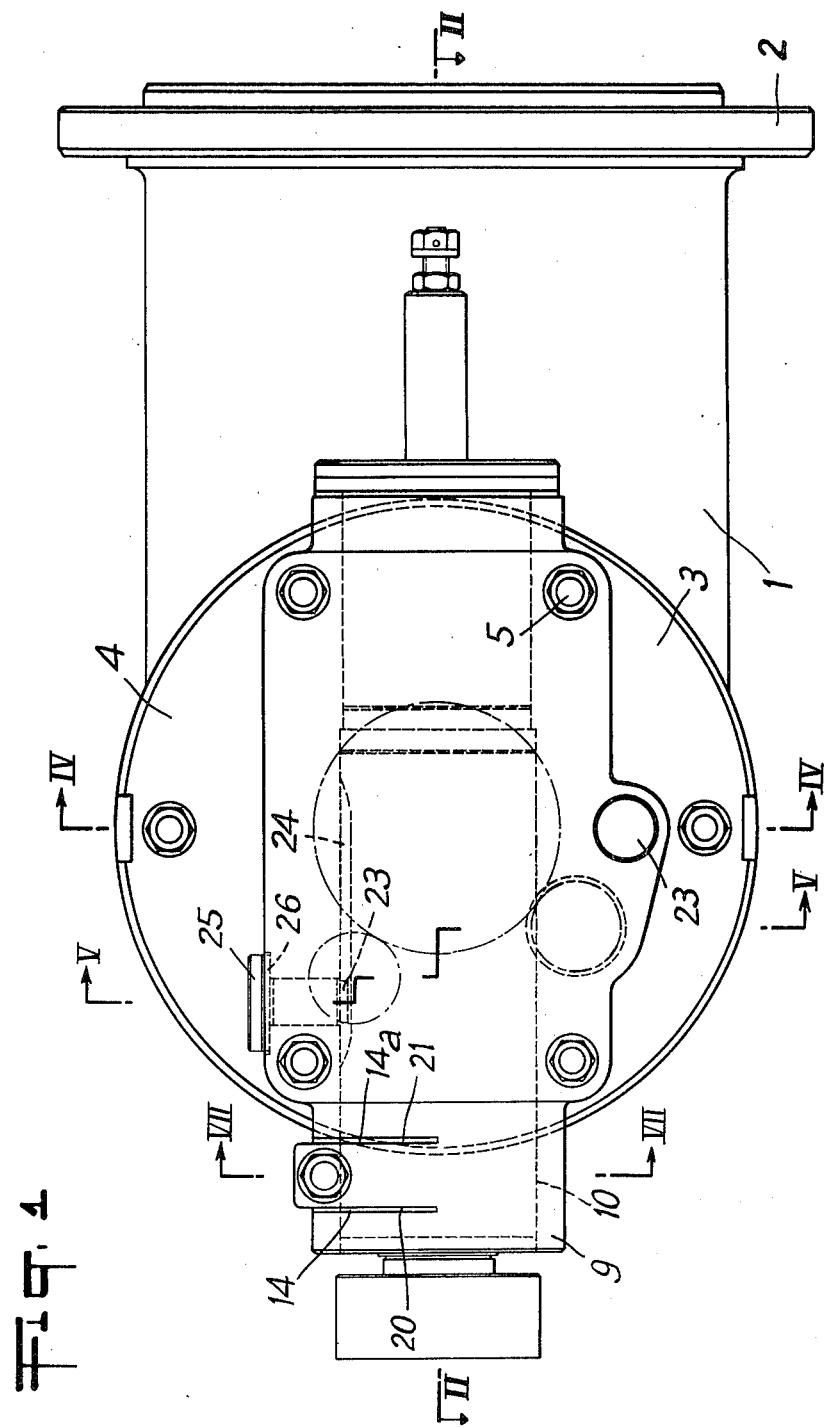

United States Patent [19]
Berthiez

[11] 3,885,280
[45] May 27, 1975

[54] BI-ROTATIONAL HEADS MOUNTED ON MILLING AND BORING MACHINES

[76] Inventor: Charles William Berthiez, 5, Avenue Eglantine, Lausanne, France

[22] Filed: Dec. 26, 1972

[21] Appl. No.: 318,635

[30] Foreign Application Priority Data
June 1, 1972 France .............................. 72.00377

[52] U.S. Cl. ..................... 29/26 R; 90/15 R; 90/17; 408/35; 408/236
[51] Int. Cl. ....................... B23b 39/02; B23b 39/14
[58] Field of Search .............. 29/26 R; 90/15 R, 17; 408/35, 236

[56] References Cited
UNITED STATES PATENTS

| | | | |
|---|---|---|---|
| 1,989,007 | 1/1935 | Gorton | 408/236 X |
| 2,859,644 | 11/1958 | Watts | 408/35 X |
| 2,952,170 | 9/1960 | Hansen et al. | 408/35 |

Primary Examiner—Andrew R. Juhasz
Attorney, Agent, or Firm—Stevens, Davis, Miller & Mosher

[57] ABSTRACT

A bi-rotational heat for milling and boring machines comprises a body on which is pivotally mounted a casing provided with a slider in which is rotatably mounted a tool carrying spindle connected by a kinematic chain to the rotary spindle of the milling and boring machine. The spindle bearing slider is connected by a kinematic chain to a sliding member of the machine tool for its forward movement.

10 Claims, 8 Drawing Figures

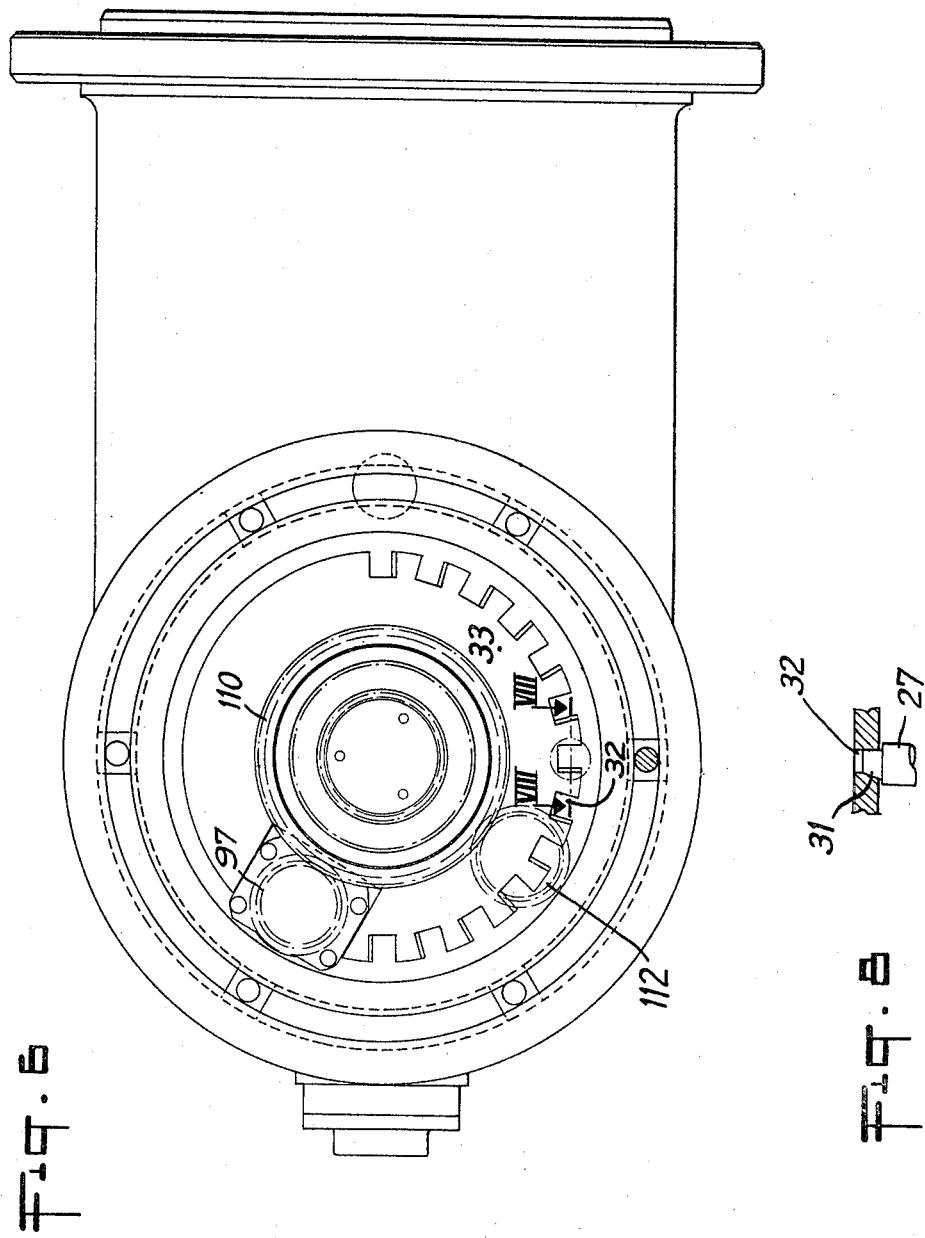

BI-ROTATIONAL HEADS MOUNTED ON MILLING AND BORING MACHINES

The present invention relates to bi-rotational heads mounted on milling and boring machines.

It is known to mount auxiliary bi-rotational machining heads on the headstock of a milling and boring machine to carry out such operations as milling, drilling and boring. The tool-carrying spindle is driven round by means of a kinematic train which is connected to the rotary spindle of the machine-tool when the head is mounted on the headstock.

Furthermore, it is also known to use a forward drive for the spindle-carrier and thus for the tools, which is achieved by means of a kinematic train also driven by the rotation of the spindle of the machine-tool.

To achieve suitably graduated amounts of forward feed per revolution of the spindle, exchange gear-wheels are used which are mounted in the train.

The need to change the gear-wheels manually so as to achieve the most suitable degree of forward movement for each machining requirement results in a very considerable loss of time, which is more particularly felt with numerically controlled machines since the latter are required to keep up a high production rate.

Also, the exchange gear-wheels do not allow a very wide range of variations in forward feed to be achieved and the 1 to 3 ratio generally produced covers the needs of drilling but does not allow all those of broaching or reaming or, particularly, those of screw cutting to be satisfied. The result is that bi-rotational heads so designed are mainly used for drilling.

The control of the movement of the slider is checked visually on a circular vernier and a graduated scale. Since this arrangement gives only poor accuracy it cannot be used to any advantage on a numerically controlled machine. The limits of forward and backward travel of the slider are read-off by the operator from a graduated movement-control scale and there is no automatic stop. For this reason, such an arrangement requires constant attention on the operator's part to prevent the said slider coming right up to its stop and triggering the protective torque-limiter.

Finally, the use of this head requires a large number of manual and visual operations which give rise to considerable dead times and prevent it being used on a high-output machine, particularly when the latter is equipped with numerical control. On the other hand, this head tends to be used particularly for drilling and, consequently, it is not capable of as wide use as could be desired.

According to the present invention the spindle-carrying slider is connected to a sliding member of the machine-tool by a kinematic train for its forward movement.

The essential advantage of this basic arrangement resides in the fact that the slider has available, without specific means being added, all the means of forward feed which are appropriate or may be appropriate for a sliding member of the machine, namely a very wide range of forward feed, a high-precision optical check on movement, automatic stops at the end of travel or at intermediate positions, and finally numerical control by visual display or punched tape.

This improvement enables the bi-rotational head according to the invention to be used on high output machines with numerical control, particularly in cases where this was not practicable with any advantage previously.

The sliding member may be formed by the sliding spindle of a milling and boring machine, on which the head is mounted.

It is also possible, on a milling machine, to use as the sliding member a special pusher provided with means of forward feed control.

According to a feature of the invention, the shaft bearing the primary bevel-gear, which is mounted in conventional fashion on the body of the head to produce the rotary drive to the tool-carrying spindle, is bored-out internally to receive a pusher which is capable of being coupled to the sliding spindle of the milling and boring machine.

This pusher brings about the translatory movement of a small cylindrical slider which has a rack, the linear displacement of which drives a gear-wheel keyed to a shaft which, at the other end, carries another driving gear-wheel located substantially in the junction plane of a body and a pivoting casing forming the head.

In the pivoting housing is arranged a kinematic train formed in the same way, in which the small slider is replaced by a slider which carries the tool-carrying spindle and in which the final driven gear-wheel is situated, as above, substantially in the junction plane.

According to another feature, the driving and driven gear-wheels both mesh with a toothed ring positioned concentrically with respect to the pivot axis of the head and rotating freely on this. Because of the rotation of the housing, which pivots by 180° with respect to the body, these pinions are arranged in two parallel planes, so as to enable them to move past each other when meshed with the toothed ring and when the pivoting housing is adjusted angularly. The transmission assembly has a 1 to 1 ratio so as to achieve absolute similarity between the movement of the sliding member of the machine-tool and the movement of the slider of the bi-rotational head.

Figure 2:
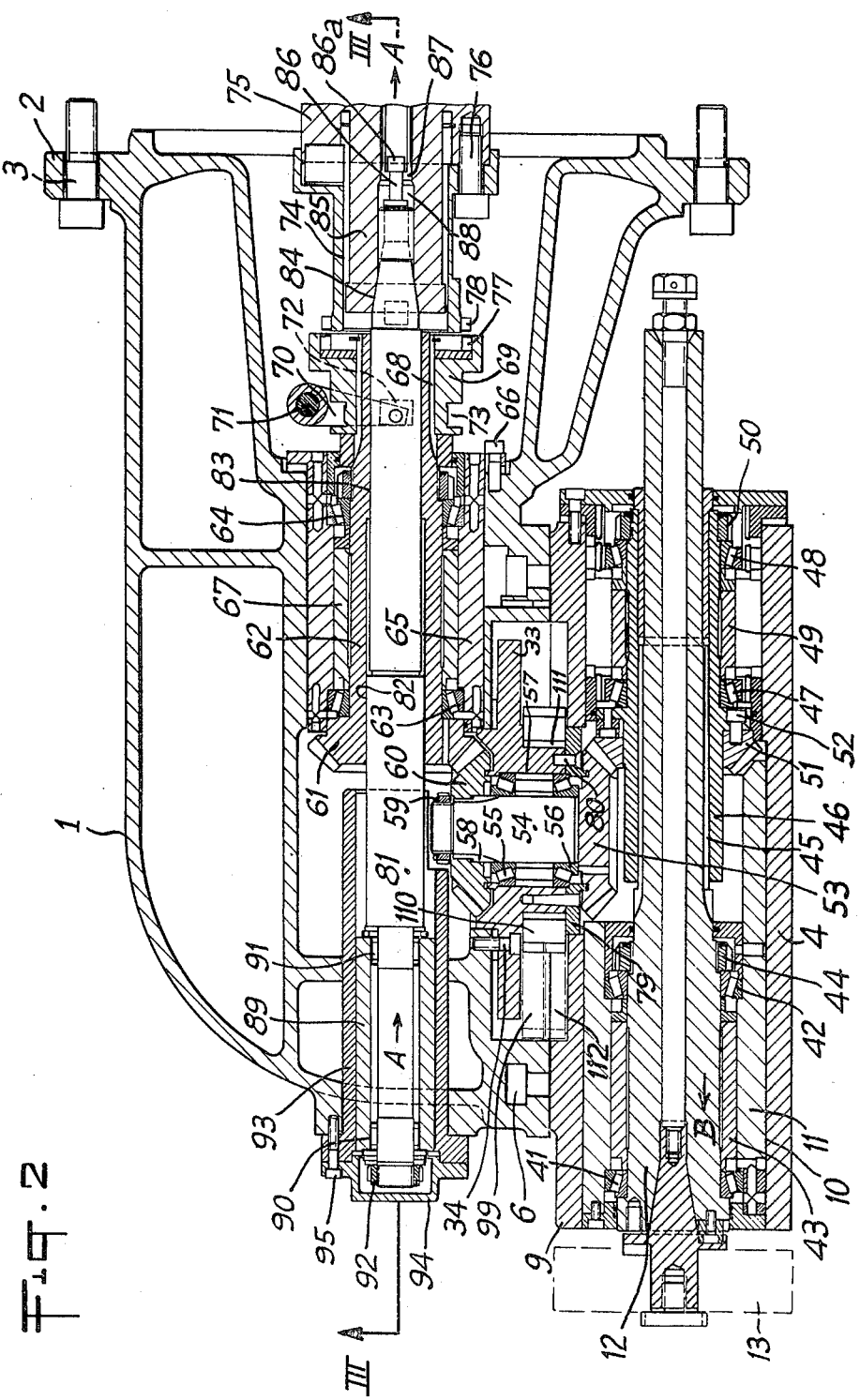
Figure 3:
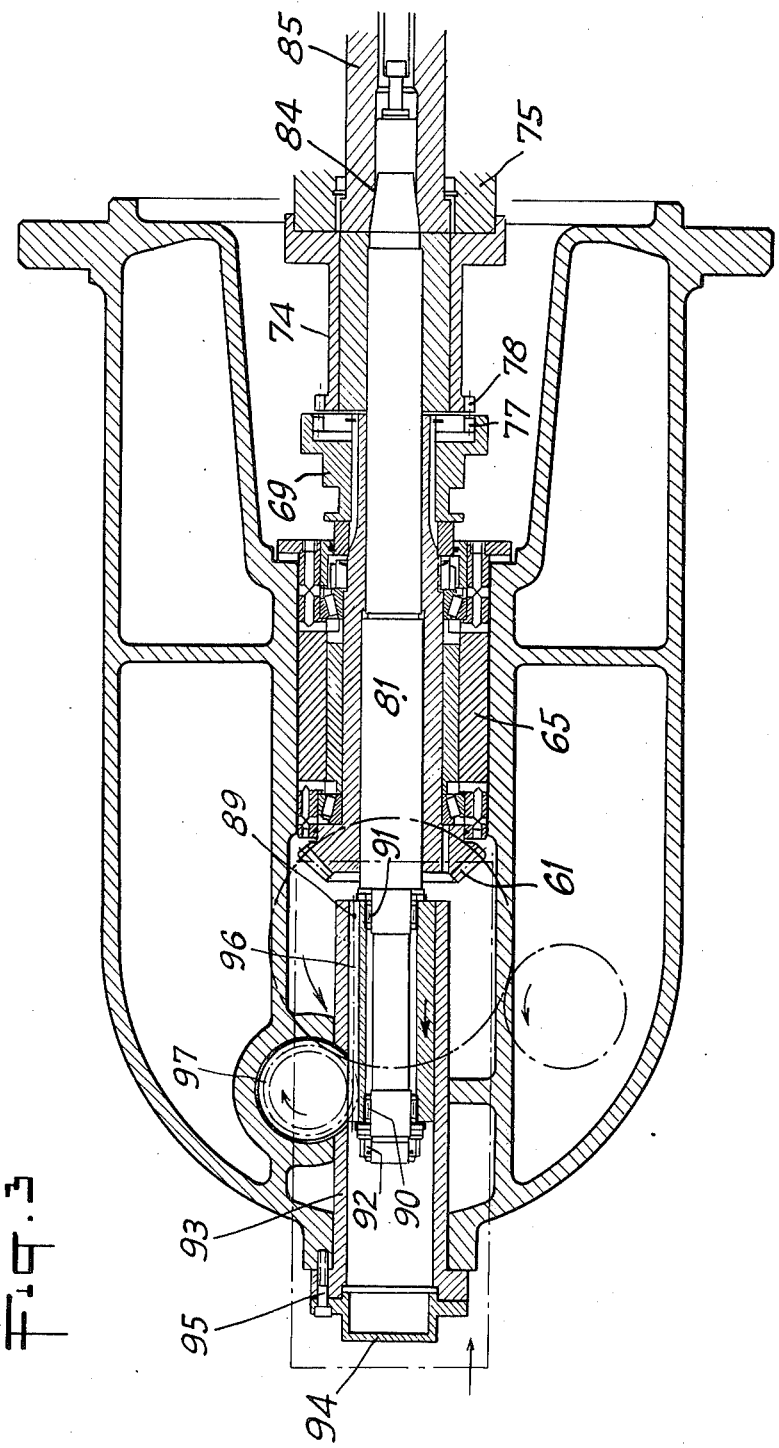
Figure 4:
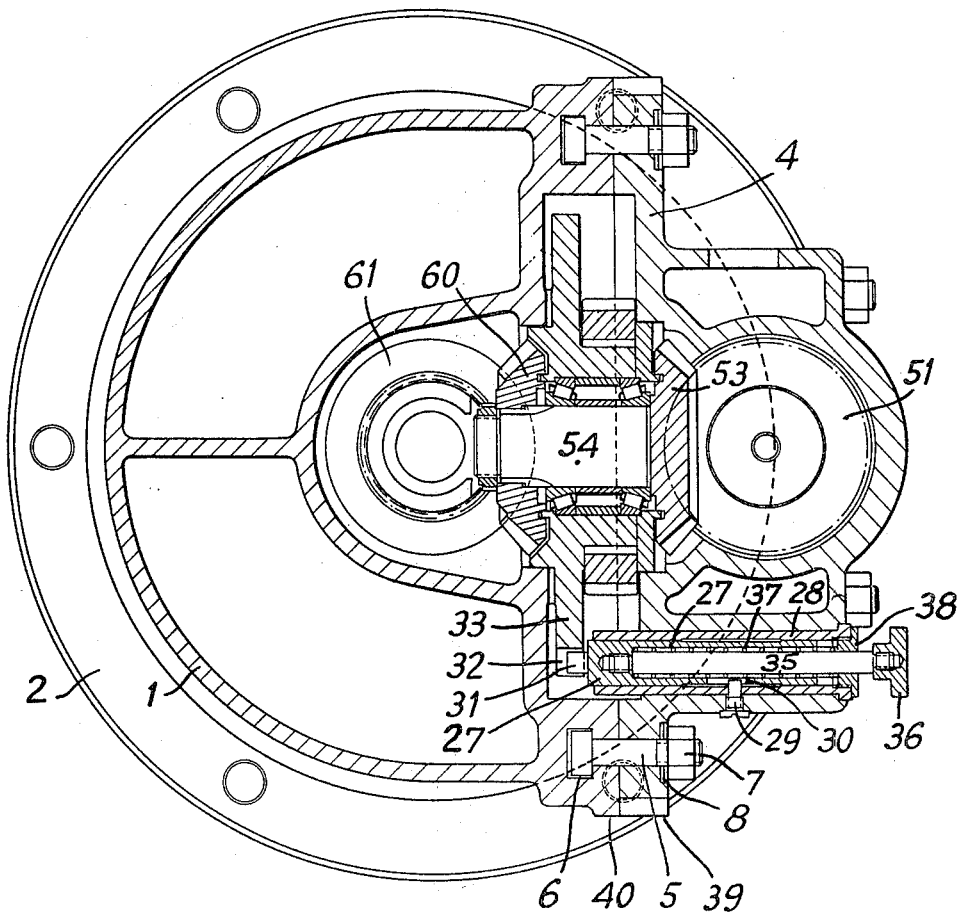
Figure 5:
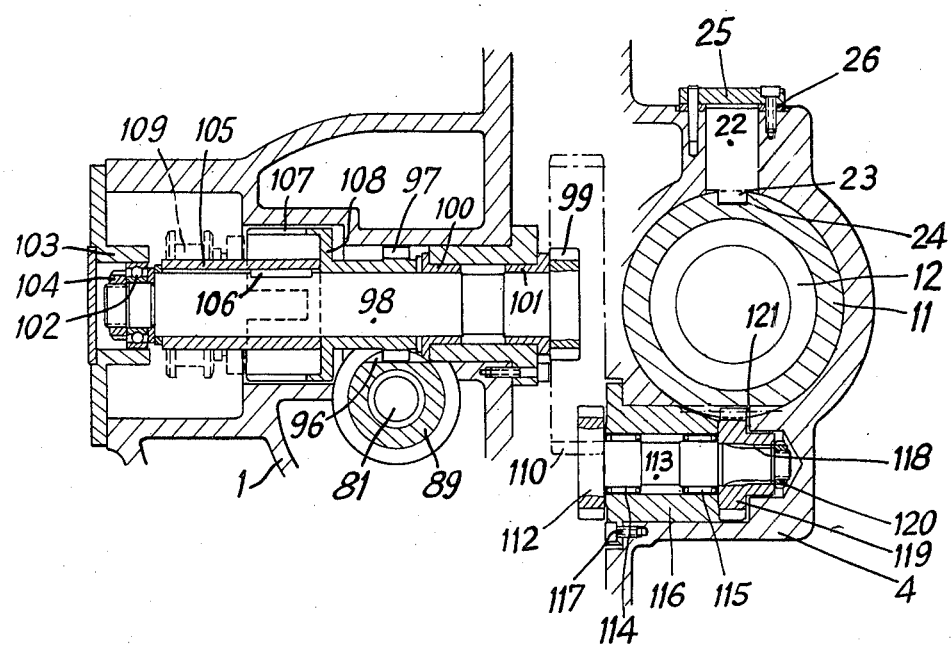
Figure 7:
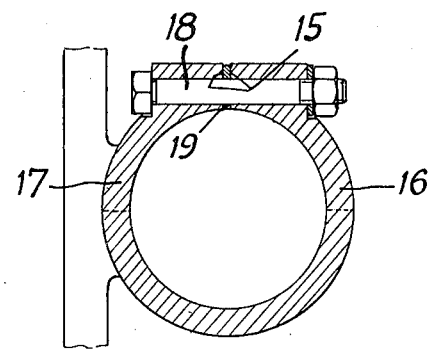

The invention will now be further described, by way of example, with reference to the accompanying drawings, in which:

FIG. 1 is an elevation view of an embodiment of bi-rotational head according to the invention, FIG. 2 is a sectional view, along line II—II of FIG. 1, showing the motion take-off from the sliding spindle of the milling and boring machine, FIG. 3 is a sectional view, along line III—III of FIG. 2 showing the pinion driven by the slider, FIG. 4 is a sectional view, along line IV—IV of FIG. 1, showing the angular locking of the bi-rotational head, FIG. 5 is a sectional view, along line V—V of FIG. 1, showing the actuating pinions for the sliding, FIG. 6 is an elevation view of the body of the head, showing the arrangement of the operating pinions, FIG. 7 is a sectional view, along line VII—VII of FIG. 1, showing the device for locking the slider, and FIG. 8 is a sectional view, along line VIII—VIII of FIG. 6, FIGS. 1, 2, 4, 5, 6 and 7 is shown a bi-rotational head according to the invention, which comprises a body 1 fixed by a flange 2 and bolts 3 to the front face of the headstock of a milling and boring machine not shown in the drawing. A casing 4 is pivotally mounted on the body 1, this casing being able to be fixed at any angular position on the said body by means of six squareheaded bolts 5, which can be moved in a circular, T-section groove 6 and which can be clamped by means of nuts 7 and lock washers 8 (see FIG. 4). The front part of the pivoting casing 4 has a cylindrical body 9 with a bore 10 in which a cylindrical slider 11 is mounted to slide with a very slight clearance. In this slider is rotatably mounted a spindle 12 carrying at one end a rotary tool 13, the means for supporting and driving which will be described in greater detail below.

On the body 9 (FIG. 7) are provided slots 14, 14a and 15 which enable the two circular half-sectors 16, 17 to flex freely and enable the latter to move together under the tightening force exerted by means of a bolt 18 until the clearance existing between the bore 10 and the slider 11 is fully taken up. A packing-piece 19 enables this approach to be confined to the necessary amount without resulting in deformation of the body 9. To prevent the entry of abrasive dust, the slots 14, 14a are plugged by two packing-pieces 20, 21 which are bonded to both faces of the slot in the body 9 (see FIG. 1).

The slider 11 is locked against rotation by a guide member 22, mounted in the casing 4, which has, at one end, two parallel faces 23 by which it is engaged in a longitudinal groove 24 on the slider 11. The guide member 22 has a flange 25 which enables the said member to be orientated and fixed, adjustment of depth being produced by the shim 26 (see FIG. 5).

In FIGS. 4 and 8 is shown a locking member 27 which is mounted to slide with restricted clearance in a holder 28 which is firmly attached to the pivoting casing 4 by a screw 29, the end of which engages in a groove 30 in the locking member 27. The end 31 of the locking member 27 is able to be engaged in appropriate cut-outs 32 provided on a divider disc 33 fixed by means of screws 34 and pinned to the body 1 of the head.

The number of cut-outs 32 is decided by the size and number of angles which it is desired to obtain by means of the locking member 27, which receives a traction rod 35 equipped at the end with a screwed-on knob 36. The locking member 27 is subject to the agency of an opposing spring 37 which bears on a plug 38 which is firmly attached to the holder 28 and which tends to hold the locking member 27 in position in the cut-out 32 which corresponds to the angular position selected.

Intermediate angles are obtained by reading off an angular vernier 39 against a gradulation scale 40 which is engraved in degrees over 180° in both directions in which the head can pivot, in order that a positive reading can be effected in both directions.

As shown in FIG. 2, the spindle 12 is mounted in a known manner in the slider 11 by means of bearing races 41, 42 and a distance-piece 43, the assembly being clamped up by a threaded ring 44. The rear end of the spindle 12 includes male splines 45 which slide in corresponding female splines in a sleeve 46, so as to enable the spindle 12 to be driven round by the sleeve 46 at the same time, this sleeve being rotatably mounted in the casing 4 by bearing races 47, 48, which are separated by a distance-piece 49 and are clamped up by a threaded ring 50.

The rotary drive to the sleeve 46 is produced by a bevel-gear 51 fixed by screws 52 to the said sleeve and meshing with a bevel-gear 53 whose shank 54 is mounted in a bore 57 in the divider disc 33 by means of bearing races 55 and 56.

To the shank 54 is fixed, by means of male and female splines 58 and a screwed-on nut 59, a bevel-gear 60 which meshes with a bevel-gear 61, whose shank 62 is supported by bearing races 63, 64, which are separated by a distance-piece 67 and are mounted in a housing 65 fixed by screws 66 to the body 1. The end of the shank 62 includes male splines 68 with which are engaged corresponding female splines in a sleeve 69 which slides axially on the shank 62 by means of a lever 70 which is keyed to a shaft 71 and which bears at the end a dog 72 which is engaged in a groove 73 on the sleeve 69. The lever is operated manually by another operating lever, which is not shown in the drawing, and which is keyed to the shaft 71.

Furthermore, a sleeve 74 is fixed by screws 76 to a spindle 75 of the milling and boring machine. Operating the sleeve 69 brings together internal teeth 77 on the sleeve 69 and external teeth 78 on the sleeve 74 and causes the gear 61 to be driven round, thus transmitting its motion through the kinematic train of gears 60, 53, 51, to the spindle 12 which is able to turn no matter what its angular position, causing the casing 4 to pivot on the body 1 around the centering member 79 which is fixed by means of bolts 80 and pins to the disc 33.

In FIGS. 2, 3, and 5 is shown a pusher 81 which is mounted to slide in bores 82 and 83 of the shank 62 of the gear-wheel 61 and of which one end has a taper 84 which centers on a corresponding female taper in a sliding spindle 85 of the milling and boring machine.

The rotational and translatory coupling of the pusher 81 to the spindle 85 is provided by the member 86 and the spring-loaded gripper 87, the unobstructed extension of which, produced by its forward movement into the cavity 88, allows free passage to the head 86a, whereas its rearwards movement provides the required tractive force. This known type of device is mainly controlled by spring washers for the rearward movement and by a hydraulic piston for the forward movement.

The other end of the pusher 81 supports and drives axially a slider 89 via two thrust bearings 90, 91 which are held in position longitudinally by the lock-nut 92. The slider 89 moves in a sleeve 93 equipped with a cap 94 and fixed by means of screws 95 to the body 1.

As shown in FIGS. 3 and 5 a rack 96 cut into the slider 89 meshes with a gear-wheel 97 which it drives round when the slider 89 moves. This gear-wheel 97 is mounted so as to rotate freely about a shaft 98 which is securely attached to a gear-wheel 99 and is supported at one side by two thrust-bearings 100, 101 and, on the other side, by a bearing race 102 mounted in a cap 103 fixed to the body 1.

Axial location of the shaft 98 is provided by a lock-nut 104, and a sleeve 105 belonging to a known type of multi-disc clutch, shown schematically in the drawing, the said sleeve being keyed to the shaft 98 by a key 106. The drive dogs of the clutch discs seat in four cut-outs 107 made in the shroud 108 which is integral with the gear-wheel 97. A ring 109 which is mounted to slide on the sleeve 105 and which is controlled in known fashion by a fork and dogs not shown on the drawing, enables the gear-wheel 97 and the shanked gear-wheel 99 to be coupled and uncoupled.

The gear-wheel 99, which is shown in broken lines in FIG. 2, meshes with a toothed ring 110 which is mounted to rotate freely on the disc 33 by means of a needle bearing 111 and with which is engaged a gear-wheel 112 which is firmly attached to a shaft 113 (FIG.

5) which is mounted via two bearing races 114, 115, in a holder 116 which is fixed by screws 117 to the pivoting casing 4. At the other end from the gear-wheel 112, the shaft 113 has splines 118 on which is keyed a gear-wheel 119 locked by a lock-nut 120, the said gear-wheel 119 meshing with a rack 121 cut in the slide.

As shown in FIGS. 2, 5 and 6, the gear-wheels 99 and 112 which mesh with the toothed ring 110, are arranged in two parallel planes such that the gear-wheel 112 which is firmly attached to the casing 4 can move across the gear-wheel 99 when the casing 4 pivots with respect to the body 1 in order that the angular position of the spindle 12 may be adjusted.

The forward-feed device for the slider 11 and the tool-carrying spindle 12 operate in the following way.

Once the angular position of the casing 4 has been adjusted by means of the locking member 27 (which is engaged with one of the cut-outs 32 in the plate 33) and the spindle 12 is being driven round by the kinematic chain formed by the gear-wheels 51, 53, 60, 61 and when the sleeve 69 is coupled to the sleeve 74 (which is firmly attached to the rotatable milling spindle 75) the sliding spindle 85 of the milling and boring machine is driven in the direction of arrow A, the slider 89 being in the position showed in FIG. 2.

The movement of the slider 89 in the direction of arrow A provides, via the pusher 81, a rotary drive to the gear-wheel 97 and the gear-wheel 99 which is coupled to it by the disc-clutch device.

By means of the toothed ring 110, the gear-wheel 99 provides a rotary drive to the gear-wheel 112 and to the gear-wheel 119 to which it is secured in rotation, the said gear-wheel 119 producing a drive to the slider 11 via the rack 121 in the direction of arrow B (FIG. 2) and also to the spindle 12.

Since the transmission ratio of the kinematic train is 1 to 1, each linear movement of the spindle 85 of the machine-tool corresponds to an identical movement of the slider 11 and of the tool-carrying spindle 12.

When the disc-clutch is disengaged and the gear-wheels 97 and 99 are uncoupled, the toothed ring 110 can turn free, thus enabling the casing 4 to be pivoted on the body 1 of the head for angular adjustment to be effected.

In effect, once the slider 11 is locked, its drive gears 112 and 119 are themself immobilised and cause the said ring 110 to rotate by a satellite effect.

It will be understood that various modifications may be made to the apparatus which has been described, merely by way of non-limiting example, without departing from the scope of the invention.

I claim:

1. A bi-rotational head for milling and boring machines having a rotary spindle and a sliding member comprising
   a body mounted on said machine capable of pivoting with respect to the rotary spindle of said milling and boring machine;
   a casing pivotally mounted on an axis disposed at an angle to said rotary spindle for rotation on said body;
   a slider positioned within said casing and connected by a first kinematic chain through said casing and said body to the sliding member of said milling and boring machine for axial translation; and
   a tool-carrying spindle rotatably mounted in said slider and connected by a second kinematic chain through said casing and said body to the rotary spindle of said machine whereby said tool-carrying spindle is capable of rotation whatever the angular position of said tool-carrying spindle and whereby said slider is capable of axial translation whatever the angular position of said tool-carrying spindle.

2. A bi-rotational head according to claim 1, wherein the sliding member is a sliding spindle of a milling and boring machine.

3. A bi-rotational head according to claim 1, wherein the sliding member is an internal pusher concentric with the spindle of a milling machine.

4. A bi-rotational head according to claim 1, wherein the first kinematic chain is formed by a pusher connected by one of its ends to the sliding member of the machine tool, the said pusher being provided at the other end with a slider which carries a rack meshing with a gear-wheel capable of being securely connected to a driving gear-wheel connected to a driven gear-wheel by means of a toothed ring, the said driven gear-wheel being firmly attached to a gear-wheel meshing with a rack provided on the slider.

5. A bi-rotational head according to claim 4, wherein the pusher is mounted concentrically with the primary gear-wheel of the kinematic train between the tool-carrying spindle mounted on the pivoting casing and the rotary spindle of the machine tool.

6. A bi-rotational head according to claim 4, wherein a coupling member is arranged between the gear-wheel meshing with the rack on the slider and the driving gear-wheel.

7. A bi-rotational head according to claim 4, wherein the toothed ring meshing with the driving gear-wheel and the driven gear-wheel is mounted concentrically with the pivot axis of the spindle-carrying casing.

8. A bi-rotational head according to claim 4, wherein the driving gear-wheel secured to the body and the driven gear-wheel secured to the pivoting, spindle-carrying casing are mounted on the toothed ring in two parallel planes and, when the casing pivots, are able to move opposite one another while remaining in engagement with the toothed ring.

9. A bi-rotational head according to claim 4, wherein the toothed ring is mounted to rotate on a divider disc fixed to the body which has, on its periphery, cut-outs in which a locking member firmly attached to the pivoting casing is able to engage.

10. A bi-rotational head according to claim 4, wherein the transmission ratio between the sliding member of the machine-tool and the slider carrying the spindle is 1 to 1.

* * * * *